H. Law,
Wood Planing Machine.

N° 6,309.   Patented Apr. 10, 1849.

UNITED STATES PATENT OFFICE.

HERVEY LAW, OF WILMINGTON, NORTH CAROLINA.

PLANING-MACHINE.

Specification of Letters Patent No. 6,309, dated April 10, 1849.

*To all whom it may concern:*

Be it known that I, HERVEY LAW, of Wilmington, county of New Hanover, and State of North Carolina, have invented a new and useful Planing, Tonguing, and Grooving Machine, and that the following is a full, clear, and exact description thereof, reference being had to the accompanying drawings, whereof—

Figure 1:
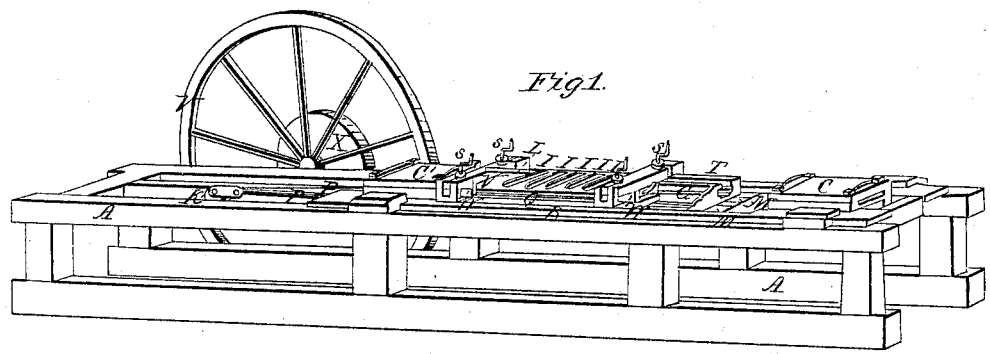
Figures 2, 5:
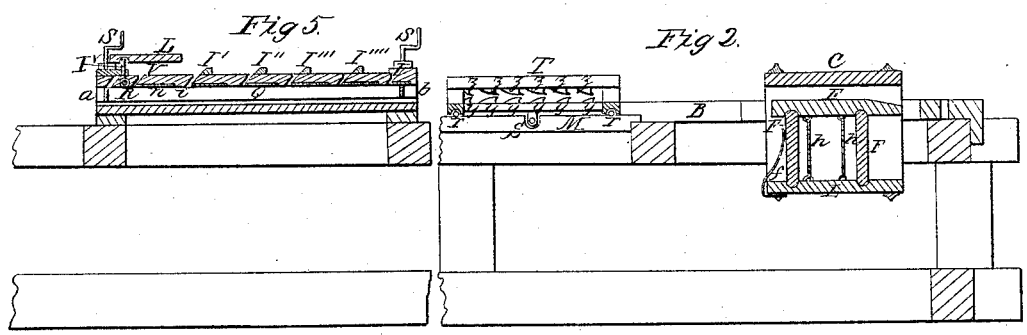
Figures 3, 4:
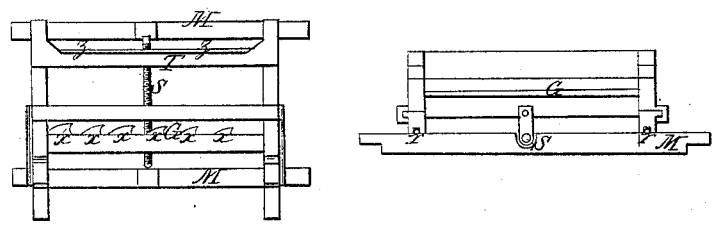

Figure 1, is a perspective view of the entire machine. Fig. 2 a longitudinal vertical section through the clamp C, and the tonguing and grooving frame T. Fig. 3 is a top view of the tonguing and grooving frame T exhibiting particularly the adjusting screw S and the form and arrangement of the grooving cutters x, x, x, while the edge only of the tonguing cutters is seen at z, z. Fig. 4 is a side elevation of the tonguing and grooving cutter frame exhibiting the manner in which the adjusting screw S is made to regulate the distance apart of the tonguing and the grooving cutters to correspond to the width of the board to be dressed. Fig. 5 is a longitudinal vertical section through the planing frame Q exhibiting near the receiving end *a* the roller R and a clearing passage V for the escape of stray shavings as also the scraper *n* and the spur *i*.

My planing machine is constructed on the principle of employing stationary cutters both for the planing and also for the tonguing and grooving operations. It employs an alternating motion to advance the boards, &c., intended to be cut so as to bring them within the action of the cutters, by quickly alternating movements.

The plane irons are so adjusted in a permanent stock beneath which the board passes, that the first cutter to which it comes, takes off a certain portion of the surface; the next cutter takes off a second portion and so on to the last which smooths the board by removing a very thin shaving and finishing the surface. The grooving cutters in like manner are arranged in a frame so as to take out several successive shavings until the groove is finally brought to the required depth.

The tonguing cutters are so arranged as to present their edges to the flat surface of the board and consequently they stand in positions at right angles to that of the grooving cutters. These cutters are so adjusted as to remove, successively, portions of the timber and finally to leave between the last cutter on the underside, and the last on the upper side of the board the thickness of the tongue. If the upper and the under tonguing cutter at that end of the frame which is near the delivery end, be brought together, as they may be, the board in passing through may have a portion entirely removed from its edge, instead of having a tongue left and the same or similar cutters by having the delivery ends of the series brought together, may be employed in slitting boards, preparatory to planing, tonguing and grooving.

In applying the principle of construction above stated, the following mechanical arrangements are those which I generally prefer.

A strong frame A, Fig. 1, supports a sliding carriage frame B, to which near the entrance end for the boards is a clamp C, to seize and carry forward the stuff to be planed, and near the delivery end of the sliding frame is another clamp C' which receives the boards after having passed all the cutters and removes them away from the machine. The sliding frame is put into alternate motion by the pitman P, moved by the crank K, which receives motion from the pulley X, or by any similar series of mechanical parts put in motion by any moving power which may be at command. The alternate movements of the carriage are short, and at each movement the board is withdrawn slightly from the cutters, and their tendency to clog is thereby prevented. On suitable pieces M, M, of the frame A is secured the tonguing cutter frame T, and the grooving frame G; and on other suitable supports on the frame A, rests the plane-stock frame Q, which frame receives the boards sent forward by the clamp C, after they have passed the tonguing and grooving cutters T, G. *s, s, s, s*, are adjusting and retaining screws which regulate the depression of the plane irons I, I, I, I, I, and determine the thickness of which the board shall be left, after planing.

*w, w, w*, are wedges on which the upper part of the plane frame rests when screwed down by the screws *s, s*, &c.

L is a pressure lever, to bear upon a frame *r* which presses down a roller R, Fig. 5. This roller in Fig. 1, is represented as near the delivery end of the plane frame and in Fig. 5 one is represented near the entrance end *a*. It is not intended to limit the number of rollers. One may be placed when required, in the rear of every cutter of the frame.

Fig. 2 exhibits the clamp frame C. The board passes between C and E. Two broad vertical supports seen in section in this figure are shown at F, F. They rest in grooves in the bottom piece of the frame D, and are prevented from escaping from these grooves by the hooks *h, h*. The spring *f* pushes back the vibrating part of the clamp and keeps it in a position to seize the board and urge it forward at every advance movement of the sliding frame B. But when the sliding frame retreats F, F, incline forward, release the board for the moment and come again into position for action when the advance movement recurs. The clamp C' being constructed, and acting in the same manner as C, it is not deemed necessary to show two sections of the same thing. In Fig. 2, is also shown the tonguing frame T, with its lower range of teeth, or cutters *y y* &c and the upper range *z, z, z*, &c., *r, r*, are two rods attached to the frame piece M, around which rods, sliding loops or staples pass to keep down the frame T, while allowing it to slide laterally to adjust its position to that of the board which is passing through it. Beneath the frame T is attached a swivel piece for the neck of the screw S to turn in, and underneath the grooving frame G (Fig. 3) is a nut similarly fixed for the screw S to work in. Only one screw is represented in the drawings but in practice two or more will in general be used, one near each end of the frame. In the elevation Fig. 4, the position of the grooving cutter is seen at G.

What I claim as my invention and desire to secure by Letters Patent is—

1. Combining with stationary cutters in a planing machine, reciprocating clamps which increase their pressure as the resistance to the advance motion of the board increases, in such manner that said clamps give a rapid intermittent or reciprocating motion to the stuff, whereby the clogging of cutters is prevented and smooth work secured substantially in the manner herein set forth.

2. I also claim the passage V and the scraper *n* arranged and operating as described, in the rear of the throat of the plane for freeing the plane from stray shavings, and for preventing the clogging of the cutters in the manner substantially as herein set forth.

3. I also claim the gaging pressure spurs *i*, placed in front of the plane-cutters, for retaining the board in its due position in contact with the bed of the planed frame Q, as herein set forth, not intending in these claims to limit myself to the exact arrangements described but to vary the same at pleasure while I attain the same ends by means substantially the same.

HERVEY LAW.

Witnesses:
  JOHN C. SAVAGE,
  G. E. BLEECKER.